3,565,718
GALVANIC PROCESS FOR MANUFACTURING ABRASIVE COMPOSITES HAVING METAL SURFACES
Richard Steding, 87 Werdohlerstrasse, 588 Ludenscheid, Germany
Original application Mar. 27, 1967, Ser. No. 626,212. Divided and this application Oct. 7, 1969, Ser. No. 864,338
Int. Cl. C23b 5/50
U.S. Cl. 156—150
5 Claims

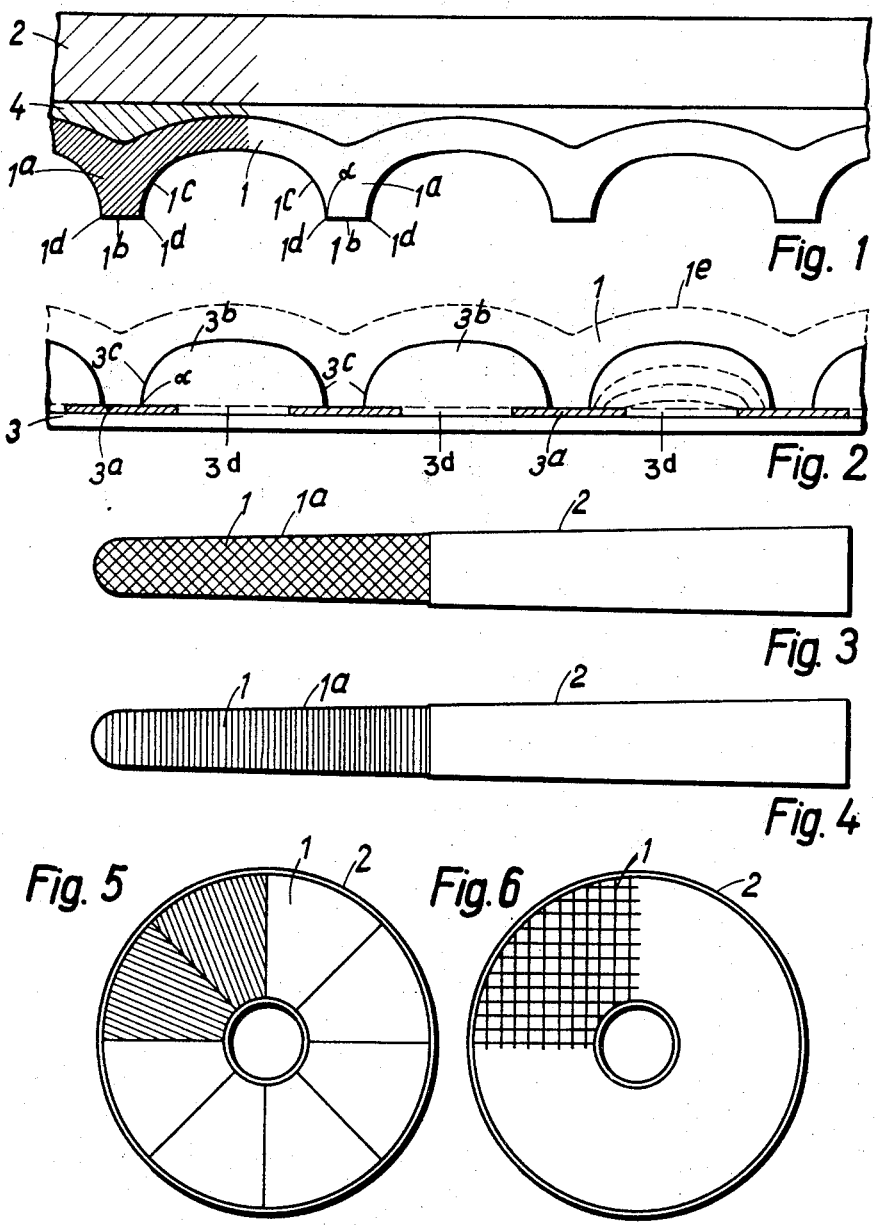

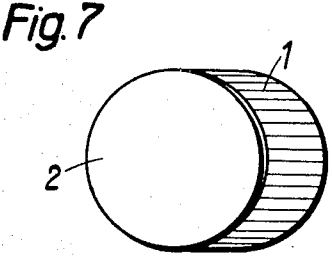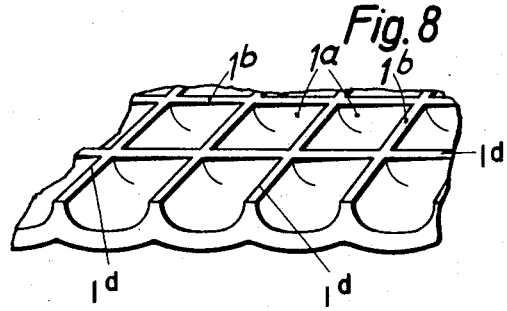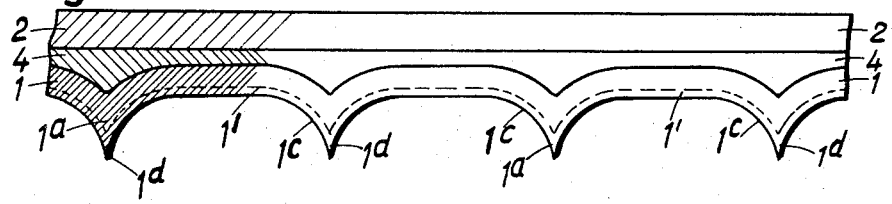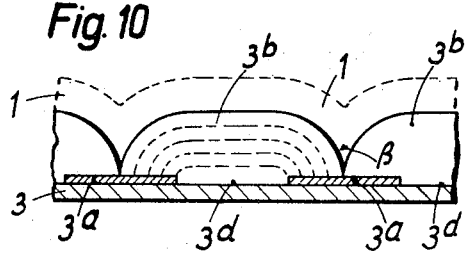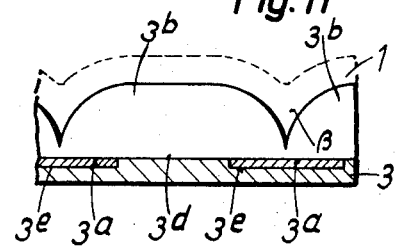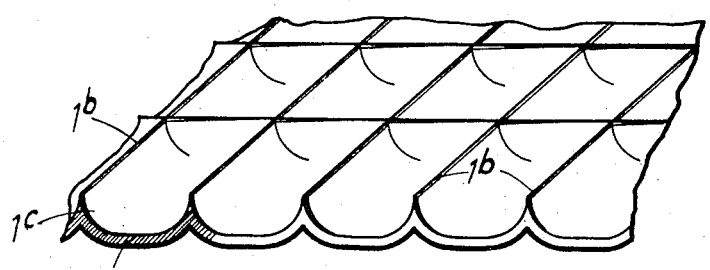
INVENTOR:
RICHARD STEDING United States Patent Office 3,565,718
Patented Feb. 23, 1971

ABSTRACT OF THE DISCLOSURE

Disclosed herein is a galvanic process for manufacturing composites having metal surfaces which composites lend themselves to be used as files.

FIELD OF INVENTION

This is a division of my co-pending patent application Ser. No. 626,212 filed Mar. 27, 1967.

The performance characteristics of conventional files are due to their manufacture by chisel cuts. The edges or teeth of files which are produced by chisel cuts are generally rounded, the cutting edges of such files are never rigorously planar, and their surfaces are rough.

Double cut files include a large number of relatively short narrowly spaced teeth which bite into the work, and remove increments thereof. Therefore the finish produced by double cut files is generally even coarser than that of single cut files. If it is desired to achieve a smooth finish, a polishing, and often a varnishing operation, must follow a preceding filing operation.

It is one object of this invention to provide a process for manufacturing a novel type of files having more desirable performance characteristics than files including rows of chisel cuts, i.e. which do not roughen the surfaces which are being filed, and which may even polish the surfaces which are being filed.

Another object of this invention is to provide a process for manufacturing composite files which include a lamination of sheet metal having a working surface of relatively great hardness and a back-up structure supporting the lamination. A laminated file of this description limits the cost of production in spite of the use of relatively expensive metals for its sheet metal layer.

Another object of the invention is to provide a method for manufacturing files which lend themselves to be used as fingernail files and may be used both for filing the edges of fingernails and for polishing the surfaces thereof.

A further object of this invention is to provide a method for manufacturing files for filing and polishing workpieces of plastics, or of synthetic resins.

A further object of this invention is to provide a galvanic process for manufacturing files having the above performance characteristics, and to provide an electroless process for manufacturing files having the above performance characteristics.

Since the performance of a file depends predominantly upon the condition of its surface rather than that of what lies behind its surface, in making laminated files it is possible to select the most desirable materials for producing the surface of the file and to select the most desirable materials for providing a support for a surface layer. This invention relates to a process for making composite materials and particularly files of this nature.

The process according to this invention is, in part, an adaptation of process steps used in manufacturing so-called printed circuits. In a modification of this method the process of so-called electroless plating is being used.

Electroless plating is a plating process not resorting to metal deposition by an electric current, as in galvanic plating. Electroless plating is a process which is generally known by the trademark KANIGEN which stands for KAtalytic NIckel GENeration. This process is based on a chemical reduction of a salt of nickel. The reduction is not effected by ions, as in galvanic plating, but by hydrogen in status nascendi.

When a metal is deposited either by galvanic plating, or by electroless plating, on a very smooth highly polished surface as, for instance, a glass surface that has been rendered electroconductive, or a metal surface, molecules of the metal deposit on the base material in layers having the thickness of a molecule, thus establishing a glossy metal surface of extreme smoothness. The files according to this invention are predicated on the presence of metal layers of molecular thickness and molecular smoothness.

SUMMARY OF INVENTION

The process of manufacturing composites such as, for instance, composite files includes the steps of providing a support with a pattern of electroconductive strips and intermediate non-electroconductive strips; forming a plating matrix on said support by plating said support until corrugations are formed on the surface thereof by lateral growth of plating metal extending over said intermediate non-electroconductive strips thereof; providing a coat of electroconductive release medium on the surface of said plating matrix remote from said support; plating an additional layer of metal on said surface of said plating matrix remote from said support, and thus forming a separable sheet metal layer having concave surface elements on one side thereof and convex surface elements on the other side thereof; separating said separable sheet metal layer from said plating matrix; and bonding to a substratum the side of said separable sheet metal layer which is remote from said plating matrix during the formation of said separate sheet metal layer thereon.

BRIEF DESCRIPTION OF THE DRAWINGS

FIG. 1 is a cross-section of an abrasive tool formed by the process according to the present invention, FIG. 1 being drawn on a considerably larger scale than 1:1;

FIG. 2 is partly a cross-section and partly an elevation of a plating matrix for receiving an electrolytic deposit of a sheet-like metal intended to form a part of the file structure of FIG. 1;

FIG. 3 is a top plan view of a double cut fingernail file produced according to the present invention;

FIG. 4 is a top plan view of a single cut fingernail file produced according to the present invention;

FIG. 5 is a top plan view of a rotatable, substantially disc-shaped file produced according to the present invention;

FIG. 6 is a top plan view of another rotatable, substantially disc-shaped file produced according to the present invention.

FIG. 7 is an isometric view of a rotatable substantially roller-shaped file produced according to the present invention;

FIG. 8 is an isometric view of the active portion of a particular file produced according to the present invention and including a rectangular pattern of polishing surfaces;

FIG. 9 is a cross-section of a file produced according to the present invention drawn on a considerably larger scale than 1:1 which differs from the structure shown in FIG. 1 in that it lacks means for combining the filing action thereof with a polishing action;

FIG. 10 illustrates a process step in forming a matrix for receiving an electrolytic deposit in sheet metal form for making a file according to FIG. 9;

FIG. 11 illustrates a process step of an alternate method for forming a matrix receiving an electrolytic deposit in sheet-metal form for making a file according to FIG. 9;

FIG. 12 is an isometric view of the active portion, or work-portion, of a particular file produced according to the present invention including a pattern of rectangular cutting edges and differing from the structure shown in FIG. 8 by the omission of polishing surfaces.

DESCRIPTION OF PREFERRED EMBODIMENTS OF THE INVENTION

Referring to FIG. 1, the file shown therein and produced according to the present invention includes an active sheet metal layer 1, a substratum or supporting layer 2, and a bonding material or cementitious material 4, interposed between sheet metal layer 1 and substratum or supporting layer 2. Layer 1 is a workpiece formed by electrolytic deposition on a plating matrix, as will be described below more in detail. It consists of a relatively hard metal, preferably nickel. Its thickness varies depending upon the intended use of the file. It may, for instance, be in the order of 20 microns. Sheet metal layer 1 defines a system of furrow-like cavities 1c, of which each is bounded by a pair of parallel cutting edges 1d. Reference character 1a has been applied to indicate the projections formed between contiguous cavities 1c. There are planar strips 1b of highly polished or glossy metal between contiguous furrows or recesses 1c, or between contiguous cutting edges 1d, respectively. The width of strips 1b may be in the order of 20 microns, but should not be less than 10 microns. The surface of concave furrows or recesses are likewise extremely smooth and glossy. Strips 1b have a polishing action, while edges 1d have a filing or scraping action. Reference character α has been applied to indicate the angle enclosed between surface elements of polishing strips 1b and surface elements of recesses 1C immediately adjacent to scraping edges 1d. This angle α is close to, or approximately, 90 degrees. Filings which are being removed from any surface by the action of tool 1, 4, 2 tend to drop out from the furrows 1c on account of the smoothness of the surface thereof, or may readily and completely be wiped out from furrows 1c. As shown in FIG. 1, the surface of sheet metal layer 1 remote from its front surfaces, i.e., the surface of sheet metal layer 1 which is bonded to substratum 2, forms a system of parallel projections or corrugations which are convex in cross-section. This is conducive to the formation of a strong bond between hard sheet metal layer 1, bonding material 4, and substratum 2. A hard nickel sheet such as shown in FIG. 1 build-up electrolytically has a hardness of about 60 Rockwell. By resorting to procedures described below the hardness may be increased to about 75 Rockwell. Since layer 1 combines a filing action and a polishing action it is particularly suited to be used for making fingernail files. A fingernail file of the character shown in FIG. 1 makes it possible to file the edges of fingernails, to simultaneously polish the edges thereof, and to polish the surfaces of fingernails so highly that their surfaces have substantially the same appearance as that of nails which have been polished by conventional means and varnished.

FIG. 3 shows a fingernail file which has two systems of scraping edges 1d and of polishing surfaces or polishing strips 1b. These systems intersect with each other, enclosing right angles between the constituent elements thereof.

FIG. 4 shows a fingernail file which has but one system of scraping edges 1d and polishing strips 1b, and is made up of a filing and polishing sheet metal layer which is identical to layer 1 shown in FIG. 1.

In the structure shown in FIGS. 3 and 4 the substratum 2 supporting sheet metal layer 1 has been extended beyond sheet metal layer 1 and forms a handle for operating sheet metal layer 1.

FIG. 2 illustrates the various steps involved in a galvanic process for making a matrix for making sheet metal layer 1 of FIG. 1 and in electrolytically depositing a sheet-metal-like deposit on the matrix which forms layer 1 of FIG. 1.

In FIG. 2 reference character 3 has been applied to indicate a highly polished and extremely smooth plate. Plate 3 may be of a metal. Instead of using a metal plate a metal-clad insulating plate may be used. Plate 3 defines a pattern of parallel insulating strips 3a and intermediate recesses 3d which are likewise strip-shaped. Such a pattern may be established in various ways as, for instance, by printing, or by well-known photographic means. These photographic means include coating the plate with a light-sensitive medium that hardens under the action of light, exposing strip-shaped areas of the plate to the action of light to harden these areas, and removing the areas of the plate which have not been hardened by the action of light. When such a plate is treated in an electrolytic bath, or galvanized, a metal deposit forms initially in the recesses 3d. As the process of galvanic electro-deposition is continued, the deposit flares out, or grows laterally, and then projects over the insulating strips or non-electroconductive strips 3a. The dotted lines to the right of FIG. 2 illustrate successive phases of the growth of the electrolytic deposit resulting from continued deposition of nickel, or of a comparable hard metal. It is apparent from FIG. 2 that the deposit flares out progressively, or progresses to grow laterally, thus covering more and more of each of the insulating strips 3a. The process of electrodeposition is interrupted when the spacing between contiguous electrodeposits 3b is in the order of 20 microns. In other words, the galvanic process of electrodeposition is interrupted before the separate deposits—shaped like mounds—merge on account of the flare-out thereof, and before the nonelectroconductive strips are entirely covered by the deposits 3b. The latter then have in side elevation somewhat the shape of a mushroom, as clearly shown in FIG. 2. The spacing being exposed, i.e. noncovered portions of insulating strips 3a is at least 10 microns or, in other words, the exposed area of insulating strips 3a has a width of at least 10 microns. The angle α enclosed between the surfaces of insulating strips 3a and the surfaces of electrodeposits 3b is about 90 degrees at the time the process of galvanic electrodeposition is interrupted. The plate 3 and the galvanic electrodeposits 3b formed thereon are then used as plating matrix for receiving another galvanic sheet-like deposit, namely a galvanic deposit which forms the filing and polishing sheet metal layer 1 of the structure of FIG. 1.

At the time the process of building up the structure or matrix of FIG. 2 is interrupted, the surface thereof remote from plate 3 is extremely smooth, and has a high gloss, and this is of vital importance in order to impart similar surface properties to the polishing strips 1b and the recesses 1c of the sheet metal layer 1 of the structure of FIG. 1.

The next process step consists in providing the surface 3c of matrix 3, 3a, 3b remote from its flat support 3 with a layer which permits removal of a galvanic deposit formed thereon. Such a layer must be formed by a chemical release agent which is conductive, e.g. by ammoniumbichromate. As an alternative, the surface 3c of matrix 3, 3a, 3b remote from its flat support 3 may be chrome plated, such a plating operating as a release agent.

The final step in forming the sheet metal layer 1 of FIG. 1 consists in forming a galvanic deposit of sufficient thickness on the matrix 3, 3a, 3b, as indicated by a dotted line in FIG. 2. Reference character 1e has been applied to indicate the surface of the galvanic deposit 1 formed on matrix 3, 3a, 3b remote from plate 3. This surface is then treated with cementitious material 4, to be bonded to substratum 2 of FIG. 1.

A file of the kind shown in FIG. 1 is particularly suited for machining and polishing plastics, or synthetic resins which may be either thermoplastic or thermosetting, e.g. to remove irregularities and blemishes from the surfaces of workpieces made of plastics or synthetic resins, the presence of irregularities or blemishes being inherent in the manufacture of such workpieces.

FIGS. 5 and 6 illustrate disc-shaped files intended to be used for the above purpose, and particularly suitable for this purpose. According to FIG. 5 the substratum or support 2 for the file proper in sheet metal form is in the shape of a circular disc. The latter is covered with section-shaped filing surfaces, each of them being oriented in a different way. To be more specific, the structure of FIG. 5 is made up of sectors of which each is substantially identical to the structure of FIG. 1, each including a single system of parallel furrows 1c and parallel filing edges 1d and parallel polishing strips 1b. The orientation of this system is different in contiguous sectors of the disc-shaped filing tool. The orientation of the aforementioned furrows, filing edges and polishing strips in each sector corresponds to the direction of the median radius of the respective sector. Similar results may be achieved by providing the active sheet metal portion of the filing tool with two intersecting systems of furrows, filing edges and polishing strips. This has been mentioned above in connection with FIG. 3 and is clearly shown in FIGS. 6 and 8.

FIG. 8 is an isometric view of a piece of sheet metal for making a filing tool including two systems of furrows, filing edges and polishing strips which intersect at right angles. The structure of FIG. 8 is formed by the same process of galvanic deposition as disclosed in connection with FIG. 2.

The file shown in FIG. 7 comprises a drum-shaped rotatable support for a sheet-metal-overlay 1 as shown in FIG. 1 at 1 and described in connection with that figure. The sheet-metal-overlay 1 of the structure of FIG. 7 has a single system of furrows, filing edges and polishing strips which system is arranged, or oriented, parallel to the axis of the drum-type support, as indicated in FIG. 7. The file of FIG. 7 is a kind of milling tool particularly suitable for machining or deburring and polishing workpieces of a plastic material, or a synthetic resin. Drum-type files as shown in FIG. 7 may also be provided with a sheet-metal-overlay involving two intersecting systems of furrows, filing edges and polishing strips as shown in FIG. 8.

FIG. 8 shows that the filing edges 1d and the polishing strips 1b are situated in a common plane and are at the same level, even at the points where the filing edges and polishing strips intersect at right angles. This cannot be achieved with any file manufactured by conventional file manufacturing methods, involving penetration of a chisel-like forming tool into the surface of a file body. Files manufactured by this method are uneven at the points where the chisel-made filing edges intersect.

In FIG. 9 the same reference characters as in FIG. 1 have been applied to indicate like parts. Hence FIG. 9 does require additional comments only to the extent that the structure shown therein differs from that shown in FIG. 1. The structure shown in FIG. 9 differs from that shown in FIG. 1 only inasmuch as the width of the strips 1d is virtually zero, i.e. strips 1d take the form of sharp filing edges. As a result, the tool shown in FIG. 9 has a filing or scraping action, but lacks the additional polishing action of the structure of FIG. 1. However, the edges 1d of the structure of FIG. 9 have one common feature with the polishing strips 1d of the structure of FIG. 1 which consists in that both are of molecular smoothness as, for instance, the surface of a mirror. Therefore, if a workpiece is treated with a file of the type shown in FIG. 9, the surface of the workpiece is not roughened, as is always the case when a workpiece is treated with a conventional file, i.e. which is produced by conventional file-making processes.

FIG. 10 illustrates a method for manufacturing a file sheet metal overlay 1 for a structure of the type shown in FIG. 9. The plating matrix includes the metal plate 3 covered with strips 3a of electrical insulating material defining recesses therebetween to which reference character 3d has been applied. The depth of these recesses may be increased by etching, if desired, the etching process being substantially the same as applied in the art of photoengraving. The plate 3 with the insulating strips 3a thereon is subjected to a galvanic deposition process, the various consecutive phases of which are indicated in FIG. 10 by dotted lines. The process is interrupted at such time when the convex deposits or mounds resulting from fanning out or lateral growth merge to form a continuous layer, completely covering insulating strips 3a. Reference character β has been applied to indicate the acute angle formed between contiguous merging deposits 3b.

FIG. 11 illustrates a modification of the matrix-forming process of FIG. 9. A highly polished metal plate 3 is covered with a light-sensitive material or photoresist. Upon exposure thereof to a pattern of spaced strips, the photoresist is removed at the points where not exposed to the action of light, thus exposing the metal plate 3 at these points to the action of an etching medium, or acid. The cavities resulting from the ensuing etching step are filled with an electric insulating material to which reference character 3a has been applied. The plate 3 is then ground to remove the remaining photoresist, thus exposing the strips 3d situated between non-electroconductive strips 3a. Thereupon the process of galvanic deposition of metal is started and continued until projections or mounds 3b merge into a unitary surface layer to be used as plating matrix for forming the sheet metal file sheet 1 (see FIG. 9).

In forming the file sheet it may be desirable to resort to the process known as electroless plating since electroless plating lends itself to achieving very hard metal surfaces. On the other hand, this plating process is rather time consuming and therefore expensive. It is, therefore, desirable to resort to composite file layers of sheet metal including a first layer formed by electroless plating and a second layer formed by galvanic plating. Such composite file layers are particularly desirable on account of the fact that the initial layer formed by electroless plating may safely be backed up by a layer of a relatively inexpensive material, e.g. copper or soft nickel.

FIG. 9 illustrates a file which includes two superimposed sheet metal layers of which the layer 1' supposed to exert the filing action is of a harder material than its back-up layer arranged immediately adjacent cementitious layer 4.

If it is intended to adopt the composite or two layer structure of FIG. 9, the layer 1' initially formed on the plating matrix may be removed from the plating matrix and hardened by conventional heat treatment before being built up to the required thickness by the addition of a back-up layer.

FIG. 12 illustrates a file element in sheet metal form including two systems of concave furrows 1c and of filing or scraping edges 1b which intersect at right angles, the filing or scraping edges being particularly sharp and comparable to a knife's cutting edge. Edges 1c are preferably straight and have no irregularities or recesses therein, thus precluding any scratching action necessarily resulting from the use of any prior art file.

As mentioned above, the thickness of the sheet metal foils 1 is optional. It is possible to combine two foils back to back in which case each of the two sheet metal files forms a substratum or support for the other.

The front ends 1b of projections 1a in the structure of FIG. 1 and their edges 1d in the structure of FIG. 9 do not need to be straight. They may have any desired shape as, for instance, a wave line shape, or sinusoidal shape. It is, however, of vital importance that all the polishing strips 1b of a file, and of all the scraping edges 1b thereof, be situated at exactly the same level, i.e. arranged in a common surface or common plane.

The structure disclosed herein may readily be varied without departing from the true spirit of the invention or

I claim as my invention:
1. A process for manufacturing composites having metal surfaces such as composite files, said process including the steps of
   (a) providing a support with a pattern of electroconductive strips and intermediate non-electroconductive strips;
   (b) forming a plating matrix on said support by galvanically plating said support until corrugations are formed on the surface thereof by lateral growth of plating of plating metal extending over said intermediate non-conductive strips thereof;
   (c) providing a coat of electroconductive release medium on the surface of said plating matrix remote from said support;
   (d) plating an additional layer of metal over said surface of said plating matrix remote from said support and thus forming a separable sheet metal layer having concave surface elements on one side thereof and convex surface elements on the other side thereof;
   (e) separating said separable sheet metal layer from said plating matrix; and
   (f) bonding to a substratum the side of said separable sheet metal layer which is remote from said plating matrix during the formation of said separable sheet metal layer thereon.

2. A process as specified in claim 1 wherein said plating process is interrupted before said metal corrugations cover entirely said non-electroconductive strips.

3. A process as specified in claim 1 wherein said galvanic plating process is interrupted only after said metal corrugations merge, thereby entirely covering and overlapping said non-electroconductive strips.

4. A process as specified in claim 1 wherein said separable sheet metal layer is electrolessly plated on the surface of said plating matrix remote from said support.

5. A process for manufacturing as specified in claim 1 wherein a first relatively thin metal layer of a relatively hard metal is being electrolessly plated on the surface of said plating matrix remote from said support, wherein a second relatively thick metal layer of a relatively soft metal is being galvanically plated on said first metal layer, and wherein said first metal layer and said second metal layer are being jointly separated from said plating matrix.

References Cited
UNITED STATES PATENTS

| | | | |
|---|---|---|---|
| 1,042,728 | 10/1912 | Vernaz | 29—78 |
| 2,692,190 | 10/1954 | Pritikin | 156—150 |
| 3,324,014 | 6/1967 | Modjeska | 156—150 |
| 3,398,442 | 8/1968 | Palmer | 204—12 |
| 3,424,635 | 1/1969 | Grandinetti et al. | 156—150 |

BENJAMIN R. PADGETT, Primary Examiner

E. E. LEHMANN, Assistant Examiner

U.S. Cl. X.R.

29—78; 51—297; 204—15